United States Patent
Choi et al.

(10) Patent No.: US 10,220,746 B2
(45) Date of Patent: Mar. 5, 2019

(54) CENTER CONSOLE ARMREST ASSEMBLY FOR VEHICLE

(71) Applicants: Hyundai Motor Company, Seoul (KR); Kia Motors Corporation, Seoul (KR); DAEJOO PRECISION INDUSTRIAL CO., LTD., Hwaseong-si (KR)

(72) Inventors: Sung Sik Choi, Suwon-si (KR); Hye Kyung Kim, Suwon-si (KR); Dae Ig Jung, Suwon-si (KR); Keun Hong Bae, Suwon-si (KR); Ki Young An, Sacheon-si (KR)

(73) Assignees: Hyundai Motor Company, Seoul (KR); Kia Motors Corporation, Seoul (KR); DAEJOO PRECISION INDUSTRIAL CO., LTD., Hwaseong-si (KR)

( * ) Notice: Subject to any disclaimer, the term of this patent is extended or adjusted under 35 U.S.C. 154(b) by 0 days.

(21) Appl. No.: 15/798,133

(22) Filed: Oct. 30, 2017

(65) Prior Publication Data
US 2018/0236909 A1    Aug. 23, 2018

(30) Foreign Application Priority Data
Feb. 20, 2017    (KR) .......................... 10-2017-0022355

(51) Int. Cl.
B60N 2/75    (2018.01)
B60R 7/04    (2006.01)
B60R 11/00    (2006.01)

(52) U.S. Cl.
CPC ............. *B60N 2/767* (2018.02); *B60N 2/793* (2018.02); *B60R 7/04* (2013.01); *B60R 2011/0007* (2013.01)

(58) Field of Classification Search
CPC .......... B60N 2/767; B60N 2/793; B60R 7/04; B60R 2011/0007; B60R 2011/0014
USPC ............. 296/24.34, 1.09; 297/411.21, 411.3, 297/411.32
See application file for complete search history.

(56) References Cited

U.S. PATENT DOCUMENTS

| | | | | |
|---|---|---|---|---|
| 8,074,832 B2* | 12/2011 | Fujiwara | ................... | B60R 7/04 220/811 |
| 8,235,442 B2* | 8/2012 | Spitler | ...................... | B60R 7/04 296/24.34 |
| 8,276,963 B2* | 10/2012 | Ishikawa | ................... | B60R 7/04 296/24.34 |
| 2004/0080173 A1* | 4/2004 | Niwa | ....................... | B60R 7/04 296/24.34 |

(Continued)

FOREIGN PATENT DOCUMENTS

KR    10-2004-0021034 A    3/2004

*Primary Examiner* — Gregory A Blankenship
(74) *Attorney, Agent, or Firm* — Morgan, Lewis & Bockius LLP

(57) ABSTRACT

A center console armrest assembly for a vehicle may include an armrest allowing an upper portion of a center console to be open, an armrest core configured to rotate about a main hinge positioned in the center console, together with the armrest, and a fixed lever fixed into the center console, the main hinge being positioned at the fixed lever, wherein the armrest slides along the armrest core to be inserted into the center console in a state in which the armrest is opened.

11 Claims, 5 Drawing Sheets

(56) References Cited

U.S. PATENT DOCUMENTS

| | | | | |
|---|---|---|---|---|
| 2005/0248170 A1* | 11/2005 | Kawamoto | ............ | B60N 2/793 296/24.34 |
| 2009/0066103 A1* | 3/2009 | Koarai | ...................... | B60R 7/04 296/24.34 |
| 2010/0066113 A1* | 3/2010 | Browne | ................. | B60N 3/102 296/24.34 |
| 2014/0138975 A1* | 5/2014 | Washio | ...................... | B60R 7/04 296/24.34 |
| 2015/0151656 A1* | 6/2015 | Bozio | ...................... | B60R 7/04 296/24.34 |
| 2015/0258923 A1* | 9/2015 | Skapof | ...................... | B60R 7/04 296/24.34 |
| 2018/0178687 A1* | 6/2018 | Choi | .................... | B60N 2/793 |
| 2018/0236909 A1* | 8/2018 | Choi | ...................... | B60N 2/767 |
| 2018/0236917 A1* | 8/2018 | Kim | ...................... | B60N 2/753 |

* cited by examiner

CENTER CONSOLE ARMREST ASSEMBLY FOR VEHICLE

CROSS-REFERENCE(S) TO RELATED APPLICATIONS

The present application claims priority to Korean Patent Application No. 10-2017-0022355, filed on Feb. 20, 2017, the entire contents of which are incorporated herein for all purposes by the present reference.

BACKGROUND OF THE INVENTION

Field of the Invention

The present invention relates to a center console armrest assembly for a vehicle. More particularly, the present invention relates to a double door type center console armrest assembly for a vehicle, in which when the center console armrest assembly is opened, armrest cores rotate together with armrests and the armrests connected to the armrest cores move downward and inward of a center console, to prevent the armrests from interfering with the external wall of the console when the armrests are opened and to minimize an amount of projection of the armrests when the armrests are opened.

Description of Related Art

In general, a console box is disposed between a driver seat and a passenger seat of a vehicle to temporarily store articles, and an armrest is disposed on the console box configured as a lid and simultaneously enable the occupants seated on the seats of the vehicle to comfortably put their arms thereon.

The armrest is important in reducing driver fatigue since it is provided to shift gears in the state in which a driver puts his or her arm on the armrest when driving long distances.

Various types of armrest exist: there are a simple armrest that is formed with a center console therein to cover only a portion of a shift lever or a parking brake lever, which is disposed to the tunnel of a floor panel between a driver seat and a passenger seat, and a large armrest that forms a portion of an instrument panel to dispose a switch, a radio, a stereo, a heater control, a small article pocket, etc. thereon and is provided with a box having a padded lid in the rear thereof while an ashtray or a switch for rear seats is disposed to the box.

There is provided an open-type armrest to use a console for various purposes in recent years, and a study is ongoing to utilize the console region within the opened armrest as a loadable region.

FIG. 1 illustrates a lateral opening type center console, wherein armrests 10 are opened right and left through fixed hinges 12.

As illustrated FIG. 1, the armrests 10 are connected to the console through the fixed hinges 12 that are disposed right and left thereon, and a console storage region is exposed by the rotation of the armrests 10.

When the fixed hinges of the armrests 10 are disposed above the console storage region, it is difficult to access the storage region since the armrests 10 are opened too high. On the other hand, when the fixed hinges of the armrests 10 are disposed under the console storage region, there is an insufficient region for the rotation of the armrests 10 although it is easy to access the storage region when the armrests 10 are opened. In addition, the armrests 10 interfere with a console external wall 11 when the armrests 10 rotate.

Furthermore, since the height of the console is restricted to maintain an upper region for the rotation of the armrests, there is a limit in enlarging the storage region.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a technology for minimizing an amount of projection of an armrest when the armrest is opened to a region above a center console by inserting the opened armrest into the center console.

In another aspect, various aspects of the present invention are directed to providing an open-type armrest in which it is easy to access a center console by inserting the armrest into the center console along an armrest core when the armrest is opened.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the accompanying drawings.

The above can be accomplished by the provision of a center console armrest assembly for a vehicle.

In an exemplary embodiment, a center console armrest assembly for a vehicle includes an armrest allowing an upper portion of a center console to be opened, an armrest core configured to rotate about a main hinge disposed in the center console, together with the armrest, and a fixed lever fixed into the center console, the main hinge being disposed at the fixed lever, wherein the armrest slides along the armrest core to be inserted into the center console in a state in which the armrest is opened.

The center console armrest assembly may further include a guide rail fastened to the armrest core, and the armrest may slide along the guide rail.

The guide rail may be disposed at a longitudinal end portion of the lower surface of the armrest.

The guide rail may have a curved shape configured to prevent the armrest from interfering with an external wall of the center console while the armrest is inserted into the center console.

The center console armrest assembly may further include an insertion portion provided in the armrest to be fastened to the armrest core, and the insertion portion may slide along a guide rail disposed in the armrest core.

The center console armrest assembly may further include a protrusion disposed at one end portion of the armrest core, and an insertion groove formed in a lower surface of the armrest to correspond to the protrusion, and the protrusion may be inserted into the insertion groove when the armrest is opened.

The center console armrest assembly may further include an elastic member disposed at the main hinge, and the elastic member may provide a constant elastic force to open the armrest.

The center console armrest assembly may further include a fixing member formed in the center console to maintain a state in which the armrest is closed.

The armrest may include an upper armrest and a lower armrest, and the upper armrest may slide in a longitudinal direction of the armrest along a sliding rail disposed in the lower armrest.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
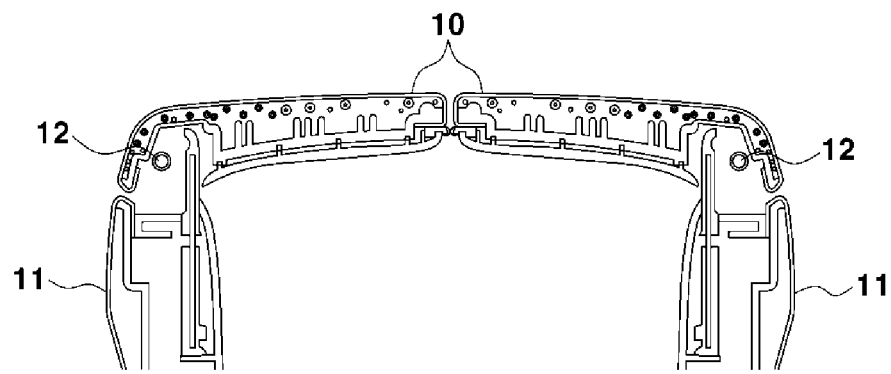
FIG. 1 is a cross-sectional view illustrating a double door type center console armrest assembly according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The terms including "part" and "shape" used in the specification of the present invention refer to units that process at least one function or operation.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Various aspects of the present invention are directed to providing a center console armrest assembly 100 that is rotated and opened, and the center console armrest assembly 100 is configured wherein an upper portion thereof is covered by an armrest(s) 200. In addition, the armrest(s) 200 may be a single armrest or double armrests. The present invention includes all components of a center console 500, the upper portion of which is opened by the rotation of the armrest(s) 200.

Hereinafter, exemplary embodiments of the present invention will be described with respect to components and coupling relationships therebetween of a double door type center console armrest assembly for a vehicle 100.

Figure 2:
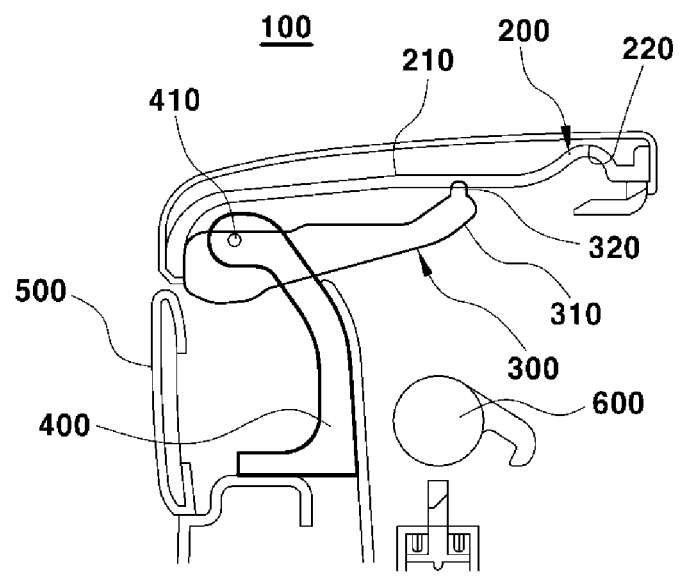
FIG. 2 is a cross-sectional view illustrating a state in which a center console armrest assembly for a vehicle is closed according to an exemplary embodiment of the present invention.

FIG. 2 is a cross-sectional view illustrating a center console armrest assembly for a vehicle 100 according to an exemplary embodiment of the present invention.

That is, as illustrated in the drawing, Various aspects of the present invention are directed to providing a center console armrest assembly for a vehicle 100 including double armrests 200. FIG. 2 illustrates one of the double armrests 200, and the exemplary embodiment of the present invention will be described below with respect to an armrest 200. The armrest 200 covers the upper end portion of a center console 500.

In addition, since the armrest 200 is rotatable to the end portion of the center console 500 from the center portion thereof, the center console 500 is opened by the rotation of the armrest 200.

In the exemplary embodiment of the present invention, the center console armrest assembly 100 includes an armrest core 300 that is connected to the armrest 200 for the rotation thereof. The armrest core 300 is fastened to the lower surface of the armrest 200. The armrest core 300 may be disposed in at least a longitudinal end portion of the armrest 200 and may be partially fastened to a guide rail 210 that is disposed at the end portion of the armrest 200.

In the exemplary embodiment of the present invention, the armrest core 300 may be disposed in the lower surface of the armrest 200, and may be connected to a main hinge 410 of a fixed lever 400 that is internally fixed to the center console 500, and may extend in a width direction of the center console 500.

In addition, the armrest core 300 is disposed internally within the center console 500 in the closed state of the armrest 200.

Since the armrest core 300 rotates about the main hinge 410 connected to a first end portion of the armrest core 300, the armrest core 300 rotates together with the armrest 200.

The main hinge 410, about which the armrest 200 rotates, includes an elastic member, and the elastic member provides a tension in the direction in which the armrest 200 is opened. Accordingly, when the armrest 200 is unlocked, the armrest 200 naturally rotates toward the end portion of the center console 500.

The elastic member is a circular spring that surrounds the main hinge 410 and is disposed in the longitudinal direction of the center console 500, and thus the elastic member is maintained in a compressed state when the armrest 200 is closed.

The armrest 200 is opened by decoupling a fixing member 600 configured to maintain the fixing state of the armrest 200, wherein the armrest 200 rotates about the main hinge 410 by the elastic force of the compressed elastic member.

The fixing member 600 is internally disposed within the center console 500, and is fastened to the lower end portion of the armrest 200 or the lower end portion of the armrest core 300 that rotates. The restriction of the armrest 200 is released by a release device disposed in the center console 500.

The release device may be a button that is disposed at the upper end portion of the armrest 200, and the restriction of the armrest 200 may be released by the fixing member 600.

In the exemplary embodiment of the present invention, FIG. 2 illustrates the state in which the armrest 200 is closed. The fixing portion 600 is fastened to the lower end portion of the armrest 200 or armrest core 300 and configured to maintain the closed state of the armrest.

Since the first end portion of the armrest core 300 is connected to the main hinge 410 that is formed at a first end portion of the fixed lever 400 disposed within the center console 500, the armrest core 300 is fixed to the armrest 200 in the closed state of the armrest 200.

Figure 3:
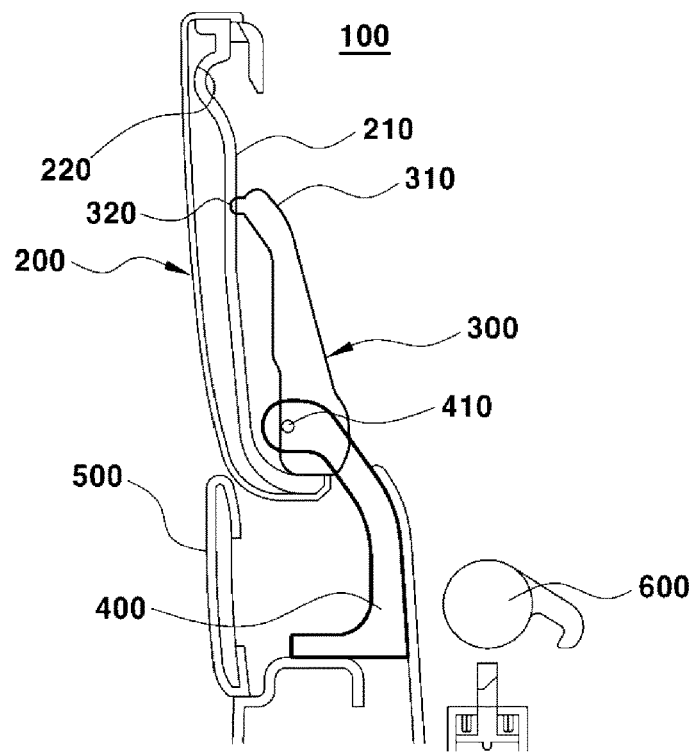
FIG. 3 is a cross-sectional view illustrating a state in which the center console armrest assembly for a vehicle is opened according to the exemplary embodiment of the present invention.

FIG. 3 is a cross-sectional view illustrating a state in which the center console armrest assembly for a vehicle 100 is opened according to the exemplary embodiment of the present invention.

As illustrated in the drawing, the center console 500 is open by rotating the armrest 200, and the armrest 200 and the armrest core 300 simultaneously rotate about the main hinge 410.

Since the center console armrest assembly 100 includes the release device disposed in the center console 500 or the armrest 200 to rotate the armrest 200 and the armrest core 300, the fixing member 600 configured to prevent the rotation of the armrest 200 is decoupled by operating the release device.

In addition, the elastic member, which provides a constant tension to rotate the armrest 200 and the armrest core 300, is connected to the main hinge 410, and the elastic member may be compressed in the closed state of the armrest 200.

The elastic member, which surrounds the main hinge 410 disposed in the longitudinal direction of the center console 500, provides a tension in the direction in which the armrest 200 rotates to open the armrest 200 in the closed state thereof. Therefore, when the armrest 200 is unlocked, it is rotated by the tension of the elastic member.

As described above, when the fixing member 600 configured to maintain the closed state of the armrest 200 is decoupled from the armrest 200 or the armrest core 300, the armrest 200 rotates about the main hinge 40 by the tension provided from the elastic member wherein the armrest 200 is opened.

In the exemplary embodiment of the present invention, when the restriction of the armrest 200 is released by operating the release device of the center console 500, the armrest 200 rotates to a region above the center console 500.

When the armrest 200 rotates about the main hinge 410, the armrest 200 protrudes upward from the center console 500 by a radius of rotation corresponding to the width of the armrest 200.

When the restriction of the armrest 200 fixed by the fixing member 600 is released, the armrest 200 rotates about the main hinge 410 together with the armrest core 300.

Figure 4:
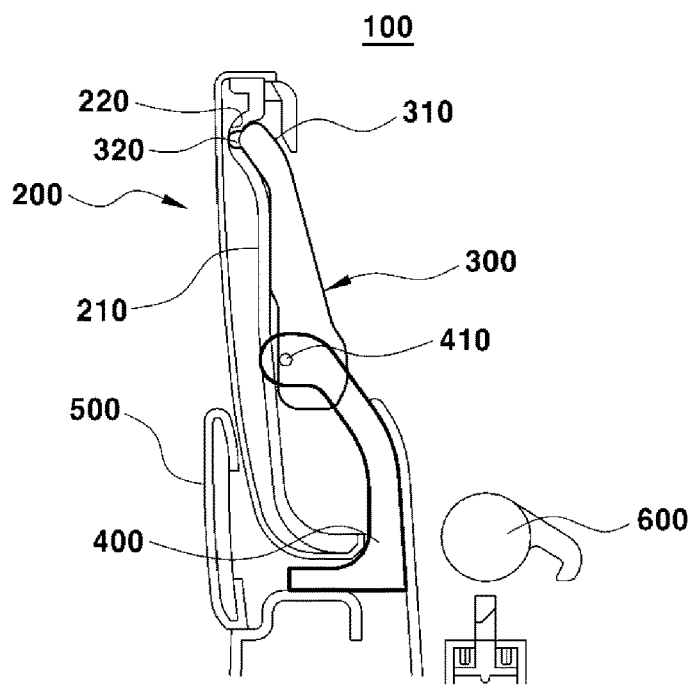
FIG. 4 is a cross-sectional view illustrating that an armrest is inserted into a center console in the state in which the center console armrest assembly for a vehicle is opened according to the exemplary embodiment of the present invention.

FIG. 4 illustrates that the opened armrest 200 is inserted into the center console 500 by sliding along the armrest core 300 in the exemplary embodiment of the present invention.

The armrest 200, which rotates about the main hinge 410, includes a guide rail 210 that is disposed in the lower surface thereof.

In addition, by components of the armrest core 300 disposed at the guide rail 210, the armrest 200 is inserted into the center console 500 by sliding along the armrest core 300.

In the exemplary embodiment of the present invention, the armrest 200 is inserted into the center console 500, namely into a region between the fixed lever 400 and the external wall of the center console 500.

Since the armrest 200 is inserted and fixed into the region between the fixed lever 400 and the external wall of the center console 500, it is possible to suppress vibrational noise generated due to the traveling of the vehicle.

The armrest core 300 connected to the guide rail 210 may include an insertion portion 320 that is fastened to the guide rail 210, and the insertion portion 320 is disposed at the guide rail 210.

The insertion portion 320 may include one or more insertion portions formed in the armrest core 300. The insertion portion 320 guides the downward movement of the armrest 200 and configured to determine a distance at which the armrest 200 moves downward.

In the case where the armrest 200 slides downward along the armrest core 300, the armrest 200 moves along the insertion portion 320 disposed at the guide rail 210. The armrest 200 moves downward by the weight thereof, and the movement direction of the armrest 200 may be determined according to a shape of the guide rail 210 disposed in the armrest 200.

In the exemplary embodiment of the present invention, the guide rail 210 disposed in the armrest 200 may have a curved shape to prevent the armrest 200 from interfering with the external wall of the center console 500.

That is, in the case where the armrest 200 moves downward, a first end portion of the armrest 200 facing the center console 500 may first move inwardly of the center console 500 to prevent the armrest 200 from interfering with the external wall of the center console and the whole armrest 200 may then be inserted into the center console 500.

In addition, the armrest core 300 may include the insertion portion 320 disposed at the longitudinal end portion of the armrest 200 wherein the guide rail 210 corresponds to the insertion portion 320 of the armrest core 300.

In addition, the guide rail 210 is configured to restrict a downward movement distance of the armrest 200, and thus the insertion portion 320 may come into contact with a first end portion of the guide rail 210 in the state in which the armrest 200 is fully inserted into the center console 500.

The armrest 200 is inserted into the center console 500, and the guide rail 210 of the armrest 200, which is disposed vertically from the center console 500 in the state in which the rotation of the armrest 200 is completed, allows the insertion portion 320 of the armrest core 300 to slide.

The present invention may include a shock absorption member configured to prevent a shock of the armrest 200 when the armrest 200 is inserted into the center console 500, and the shock absorption member may be disposed at a position in which the armrest 200 is inserted in a height direction of the center console 500.

In the exemplary embodiment of the present invention, the center console armrest assembly 100 includes an armrest insertion groove 220 formed in the lower surface of the armrest 200 and an armrest core protrusion 310 to restrict the downward movement distance of the armrest 200 and fix the inserted armrest 200 when the armrest 200 is inserted into the center console 500.

The protrusion 310 may be disposed at the first end portion of the armrest core 300, which is close to the center of the center console 500, in the closed state of the armrest 200, and the insertion groove 220 may be disposed at a first end portion of the lower surface of the armrest 200, which is close to the center of the center console 500, to correspond to the protrusion 310.

The insertion portion 320 slides along the guide rail 210 of the armrest 200 wherein the protrusion 310 is close to the insertion groove 220 when the armrest 200 is opened and inserted into the center console 500.

In addition, the protrusion 310 may be fastened to the insertion groove 220 of the armrest 200 in the state in which the armrest 200 is fully inserted into the center console 500. The insertion groove 220 may have a fastening structure including a hinge structure, and the protrusion 310 may be tightly fitted to the insertion groove 220.

Moreover, the armrest core 300 may extend in the width direction of the center console 500, and may include the insertion portion 320 that is formed in the protrusion 310.

Accordingly, when the armrest 200 is inserted into the center console 500, the insertion portion 320 slides along the guide rail 210 of the armrest 200 and the protrusion 310 including the insertion portion 320 is inserted into the insertion groove 220 disposed at the first end portion of the lower surface of the armrest 200, which is close to the center of the center console 500.

In addition, the movement distance in which the armrest 200 is inserted into the center console 500 may be determined according to the positional relationship between the insertion groove 220 and the protrusion 310 of the armrest core 300. Therefore, the armrest 200 may slide downward by the distance in which the protrusion 310 is fastened to the insertion groove 220.

Even when the armrest 200 is opened and positioned inside the center console 500 through the coupling between the protrusion 310 and the insertion groove 220, it is possible to reduce a vibration of the vehicle and noise due to the same.

Figure 5:
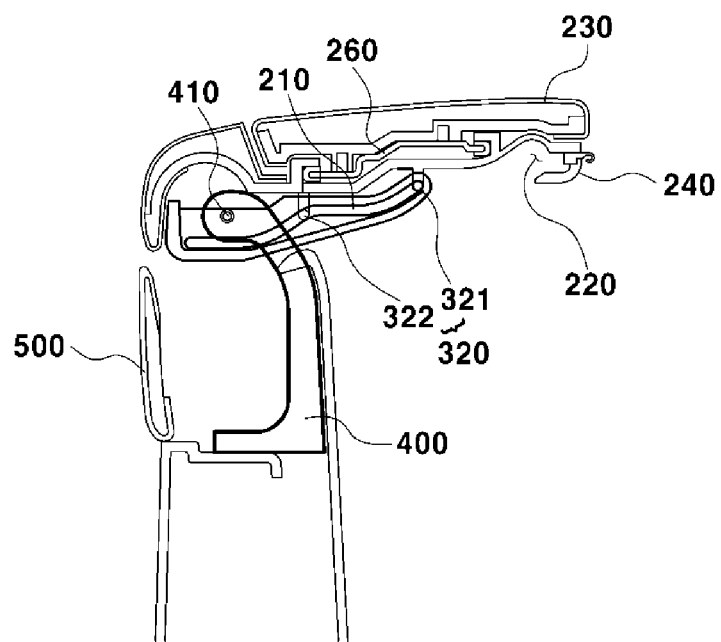
FIG. 5 is a cross-sectional view illustrating an armrest including two insertion portions in a center console armrest assembly for a vehicle according to another exemplary embodiment of the present invention.

FIG. 5 illustrates a center console armrest assembly for a vehicle 100 according to another exemplary embodiment of the present invention and one armrest 200 including two insertion portions 320 at positions in which the armrest 200 faces an armrest core 300. In addition, a guide rail 210 may be disposed in the armrest core 300.

As illustrated in FIG. 5, the armrest core 300 includes the guide rail 210 formed along the armrest 200, and the insertion portions 320 disposed in the lower surface of the armrest 200 move on the guide rail 210.

The guide rail 210 disposed in the armrest core 300 has a multistage sliding structure in a stepped form. Thus, it is possible to prevent the interference between the armrest 200 and the external wall of a center console 500 when the armrest 200 is inserted into the center console 500.

When the armrest 200 is maintained in a closed state, a first insertion portion 321 may be disposed at the end portion of the guide rail 210, which is closed to a protrusion 310 of the armrest core 300 and a second insertion portion 322 may be disposed midway between the guide rail 210.

Figure 6A:
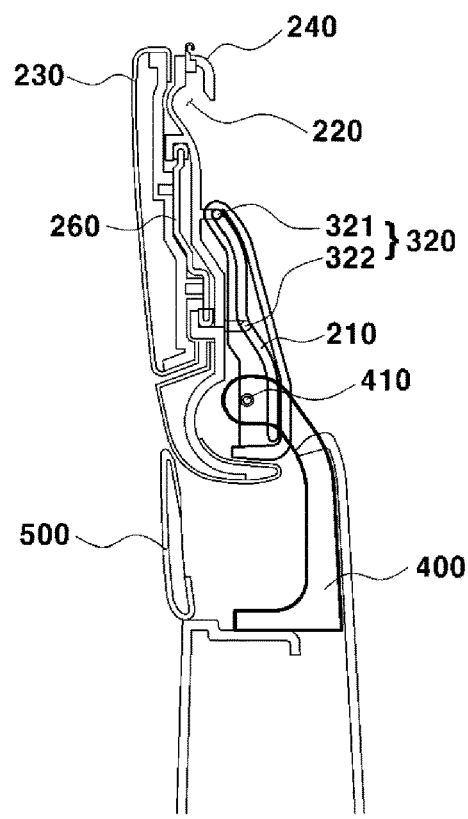
FIG. 6A is a cross-sectional view illustrating a state in which the armrest including the two insertion portions is opened in the center console armrest assembly for a vehicle according to another exemplary embodiment of the present invention.
Figure 6B:
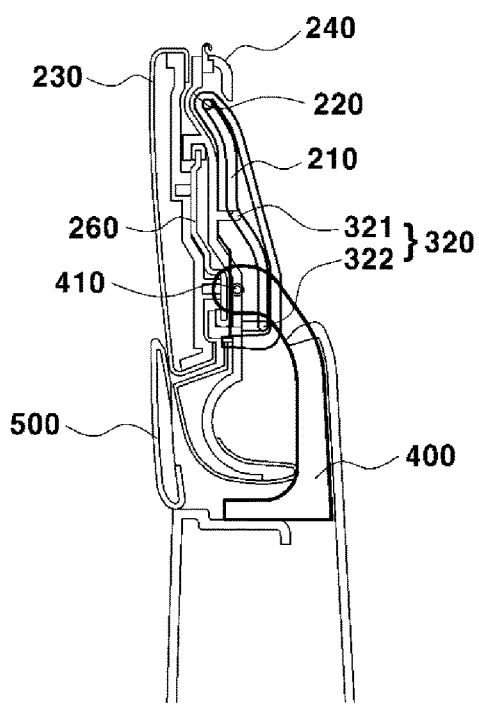
FIG. 6B is a cross-sectional view illustrating that the armrest including the two insertion portions is inserted into a center console in the center console armrest assembly for a vehicle according to another exemplary embodiment of the present invention.

FIG. 6A is a cross-sectional view illustrating a state in which the armrest 200 is opened upward of the center console 500 according to another exemplary embodiment of the present invention. FIG. 6B is a cross-sectional view illustrating the center console armrest assembly for a vehicle 100 in which the armrest 200 is inserted into the center console 500 and the center console 500 is fully open.

As illustrated in FIG. 6A and FIG. 6B, the armrest 200 is opened by rotating about a main hinge 410. In the opened state of the armrest 200, the insertion portions 320 disposed in the lower surface of the armrest 200 move along the guide rail 210 disposed in the armrest core 300.

When the armrest 200 rotates upward of the center console 500, the first insertion portion 321 of the two insertion portions 320 may be disposed at the end portion of the guide rail 210, which is closed to the protrusion 310 of the armrest core 300 and the second insertion portion 322 thereof may be disposed midway between the guide rail 210.

FIG. 6A illustrates the center console armrest assembly 100 in which the opened armrest 200 is inserted into the center console 500, namely into a region between the center console 500 and a fixed lever 400.

That is, the insertion portions 320 disposed in the lower surface of the armrest 200 move along the guide rail 210 disposed in the armrest core 300. In the present case, the second insertion portion 322, which is disposed at the lower portion, may be disposed at the end portion of the guide rail 210, which is far away from the protrusion 310 of the armrest core 300 and the second insertion portion 322, which is disposed at the upper portion, may be disposed midway between the guide rail 210.

Moreover, the guide rail 210 may have a multistage sliding structure in a stepped form. The armrest 200 moves downward and inward of the center console 500 wherein the upper surface of the armrest 200 does not interfere with the external wall of the center console 500.

FIG. 5, FIG. 6A, and FIG. 6B illustrate the center console armrest assembly for a vehicle 100 including the two insertion portions 320. The insertion portions 320 may correspond to the guide rail 210 and the number of insertions portions may vary depending on the environment of application thereto.

Moreover, the insertion portions 320 and the guide rail 210 may correspond to the armrest 200 and the armrest core 300, respectively. In the exemplary embodiment of the present invention, FIG. 2, FIG. 3, and FIG. 4 illustrate that the insertion portion 320 is disposed in the armrest core 300 and the guide rail 210 is disposed in the lower surface of the armrest 200.

On the other hand, FIG. 5, FIG. 6A, and FIG. 6B illustrate that the guide rail 210 is disposed in the armrest core 300 and the insertion portions 320 are disposed in the lower surface of the armrest 200.

Figure 7:
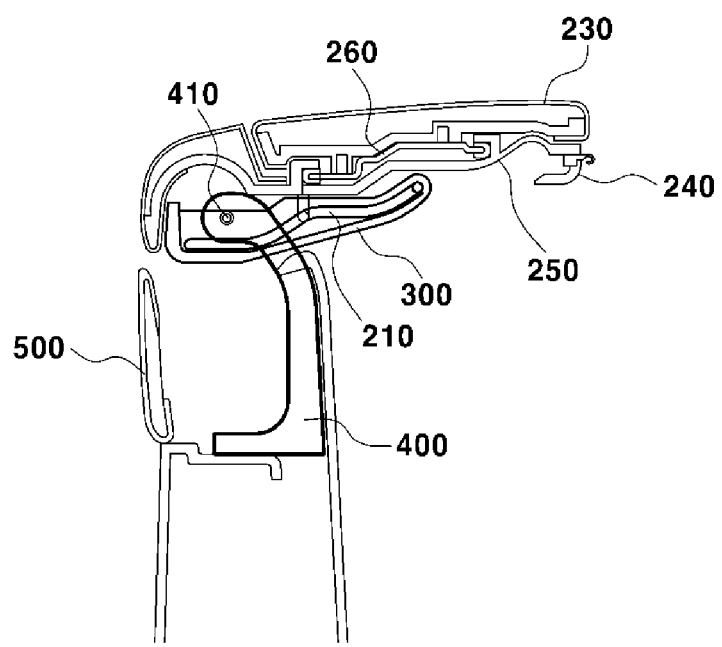
FIG. 7 is a cross-sectional view illustrating a sliding structure of a center console armrest assembly for a vehicle according to a further exemplary embodiment of the present invention.

FIG. 7 is a cross-sectional view illustrating that an upper armrest 230 slides in the forward and backward directions of a vehicle according to a further exemplary embodiment of the present invention.

As illustrated in the drawing, one armrest 200 may include an upper armrest 230 and a lower armrest 240. The lower armrest 240 may include a sliding rail 250 facing a protrusion 310 of the upper armrest 230.

The upper armrest 230 may include a bracket 260 formed at a position that comes into contact with the lower armrest 240. Both end portions of the bracket 260 may slide in the forward and backward directions along the sliding rail 250 disposed in the lower armrest 240.

As is apparent from the above description, the present invention can obtain the following effects by the configuration, combination, and relationship of components described in exemplary embodiments.

The present invention has an effect of providing an enlarged storage region by minimizing an amount of projection of an armrest when a center console armrest assembly is opened.

The present invention enables a user to easily access a storage region by reducing an amount of projection of an armrest in an upward direction of a center console when the armrest is opened.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A center console armrest assembly for a vehicle, comprising:
    an armrest allowing an upper portion of a center console to be opened;
    an armrest core rotatable about a main hinge disposed in the center console, with the armrest; and
    a fixed lever fixed into the center console, the main hinge being disposed at the fixed lever,
    wherein the armrest slides along the armrest core to be inserted into the center console in a state in which the armrest is opened.

2. The center console armrest assembly of claim 1, further including:
    a guide rail disposed in a lower surface of the armrest to be fastened to the armrest core; and
    an insertion portion disposed in the armrest core to slide along the guide rail.

3. The center console armrest assembly of claim 2, wherein the guide rail is positioned at a longitudinal end portion of the lower surface of the armrest.

4. The center console armrest assembly of claim 2, wherein the guide rail has a curved shape to prevent the armrest from interfering with an external wall of the center console while the armrest is inserted into the center console.

5. The center console armrest assembly of claim 1, further including an insertion portion disposed in the armrest to be fastened to the armrest core,
    wherein the insertion portion slides along a guide rail positioned in the armrest core.

6. The center console armrest assembly of claim 5, wherein the guide rail is positioned at a longitudinal end portion of a lower surface of the armrest.

7. The center console armrest assembly of claim 5, wherein the guide rail has a curved shape to prevent the armrest from interfering with an external wall of the center console while the armrest is inserted into the center console.

8. The center console armrest assembly of claim 1, further including:
    a protrusion positioned at a first end portion of the armrest core; and
    an insertion groove formed in a lower surface of the armrest to correspond to the protrusion,
    wherein the protrusion is inserted into the insertion groove when the armrest is opened.

9. The center console armrest assembly of claim 1, further including an elastic member positioned at the main hinge,
    wherein the elastic member provides a constant elastic force to open the armrest.

10. The center console armrest assembly of claim 1, further including a fixing member formed in the center console to maintain a state in which the armrest is closed.

11. The center console armrest assembly of claim 1, wherein
    the armrest includes an upper armrest and a lower armrest; and
    the upper armrest slides in a longitudinal direction of the armrest along a sliding rail positioned in the lower armrest.

* * * * *